UNITED STATES PATENT OFFICE.

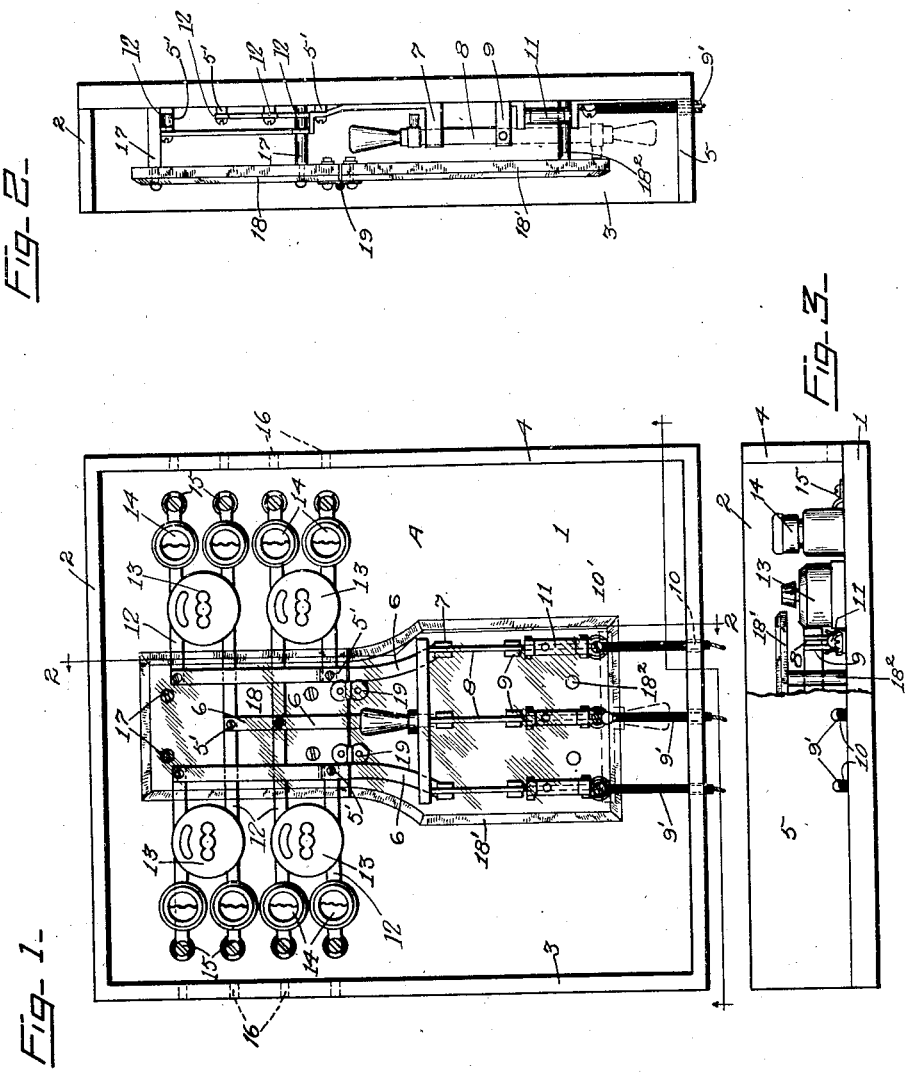

LESTER SIEBENHAUER, OF SAN FRANCISCO, CALIFORNIA, ASSIGNOR TO DRENDELL ELECTRICAL AND MANUFACTURING COMPANY, OF SAN FRANCISCO, CALIFORNIA, A CORPORATION OF CALIFORNIA.

SAFETY MEANS FOR SWITCH-BOXES.

1,228,839. Specification of Letters Patent. Patented June 5, 1917.

Application filed September 27, 1915. Serial No. 52,847.

*To all whom it may concern:*

Be it known that I, LESTER SIEBENHAUER, a citizen of the United States, residing in the city and county of San Francisco and State of California, have invented certain new and useful Improvements in Safety Means for Switch-Boxes, of which the following is a specification.

Switch panels and panel boxes as at present constructed and in universal use are constructed with a main knife blade controlling switch, a plurality of exposed bus bars and a plurality of smaller exposed knife switches for controlling the circuits leading from the main bus bars. In a construction of this type, where the heavily charged conductors and switches are of the exposed type, the hand of the operator is liable to contact with some exposed portion and the contact therewith may result fatally or in a severe burn or shock. The majority of the switches of this type are operated in very little light as that is the time the lighting of the lamps controlled thereby is necessary, and consequently the liability of the operator becoming shocked or injured is increased over that if the switches are operated in day time.

In the present type of switch boxes where the bus bars and switches are employed, damage is apt to occur by the contact of a conductive piece of material with the exposed conductors or the laying of the material across the same. It has proven too costly and unpractical to insulate each bus bar or to embed the same in the supporting panel as circuits leading from the bus bars are tapped from time to time.

The present invention relates to an improved form of switch panel or panel box wherein the liabilities to injury enumerated above are eliminated, and an advance is made along the safety first movement in regard to electrical apparatus.

The present invention has for its principal objects to provide a protecting covering for the exposed bus bars and in spaced relation thereto, the covering being either of conducting or non-conducting material and either opaque or transparent as desired, to provide suitable inclosed switches for the open knife type now used, and to provide a switch box wherein the exposed conducting members are protected from accidental contact by the operator.

With the above mentioned and other objects in view, the invention consists in the novel construction and combination of parts hereinafter described, illustrated in the accompanying sheet of drawings and pointed out in the claims hereto appended; it being understood that various changes in the form, proportion, size and minor details of construction within the scope of the appended claims may be resorted to without departing from the spirit or sacrificing any of the advantages of the invention.

To more fully comprehend the invention, reference is directed to the accompanying drawings, wherein—

Figure 1 is a view in plan of a switch box disclosing the main knife switch, the bus bars, the snap switches controlling the circuit therefrom, and the protecting plate positioned over the knife switch and bus bars.

Fig. 2 is a sectional view taken on line 2—2 of Fig. 1, disclosing more fully the hinged section of the protecting plate over the main knife switch.

Fig. 3 is an end elevation partly broken away taken from the lower edge of the box.

Referring more particularly to the several views of the drawings, wherein like characters of reference designate corresponding parts throughout the several views—1 indicates a suitable base or panel board of non-conducting material, preferably marble, and 2, 3, 4 and 5 respectively the top, two sides and bottom walls also of non-conducting material, and which with the base or panel provide a suitable switch box A.

Secured in spaced relation to the base or panel board within the switch box by the supports 5' are the bus bars 6 which connect at their lower ends with spring contacts 7. A suitable knife switch 8 pivotally mounted to the supporting posts 9 coöperates with the spring contacts 7 and controls the flow of current into the bus bars from suitable feed wires 9' which are passed through openings 10 in the bottom wall 5 and are secured to the contacts 10' which support one end of the fuses 11 which in turn connect with the supporting posts 9.

From the bus bars above the switch 8 extend the laterals 12 supported in spaced relation above the base 1 by supports 5' and each pair of which is controlled by a suitable inclosed switch 13, preferably of the well known snap type which prevents contact by the operator with the switch terminals or movable parts thereof which are charged with electricity.

Suitable fuse plugs 14 are mounted in each lateral 12 beyond the switches 13 and the wires leading from the respective laterals are connected to the terminals 15 and extend from the switch box through the openings 16 in the side walls thereof.

Supported above the bus bars, the exposed portion of the laterals and the knife switch by the supports 17 carried by the base 1 is a protecting covering or plate 18, preferably of non-conducting material, and the said plate is preferably divided within its length forming a movable section 18', and the portions are hinged together, as at 19, to permit the lower portion to be lifted when it is desired to operate the knife switch 8. The lower portion is adapted to rest on the supporting pins $18^2$ which maintain the same in spaced relation above the knife switch. While the covering or plate is illustrated in the drawing as being of glass, it is to be understood that the same may be formed of any suitable material or composition. The covering or plate is preferably of non-conducting material, but in cases where the switch box is of sufficient depth to permit the covering or plate to be spaced a sufficient distance above the bus bars so as not to be energized therefrom, the covering or plate may be of conducting material when desired. The hinged section of the covering or protecting plate enables the knife switch to be covered either when it is in its open or closed position.

By my improved device the operator will be protected from being injured by contact with the exposed portions of the bus bars, and inclosed snap switches are employed in place of the common type of knife switch commonly used in controlling lighting circuits.

It is to be understood that my invention is equally adapted for use in panel board switches as in panel boxes, and although the same is illustrated in connection with a switch panel box, I do not desire to be limited to that structure.

Having thus described my invention what I claim is:—

In a switch box the combination of a base, side walls surrounding the same and projecting above the face thereof, exposed bus bars carried on the face of said base, laterals extending from said bus bars, an insulated switch for controlling each set of laterals, a knife switch associated with said bus bars and controlling the supply of current thereto, and a protecting plate of insulating material supported above said bus bars and knife switch for protecting the same against accidental contact therewith, the portion over said knife switch being hinged to that portion over said bus bars and capable of raising to permit the operation of said switch, said hinged portion adapted for overlying said switch when the same is either in open or closed position.

In testimony whereof I have signed my name to this specification in the presence of a subscribing witness.

LESTER SIEBENHAUER.

Witness:
D. B. RICHARDS.